United States Patent [19]
Graham et al.

[11] Patent Number: 5,841,847
[45] Date of Patent: Nov. 24, 1998

[54] BILLING SYSTEM

[75] Inventors: R. William Graham, Dayton, Ohio; David M. Tumey, San Antonio, Tex.

[73] Assignee: Protel, Inc., Dayton, Ohio

[21] Appl. No.: 827,784

[22] Filed: Apr. 11, 1997

[51] Int. Cl.⁶ ................................................. H04M 15/00
[52] U.S. Cl. .......................... 379/114; 379/112; 379/116; 379/144; 379/199
[58] Field of Search .................................... 379/111, 112, 379/114, 115, 143, 144, 140, 141, 199, 116, 119

[56]  References Cited

U.S. PATENT DOCUMENTS

| 3,725,947 | 4/1973 | Albertini et al. | 379/114 |
| 3,911,446 | 10/1975 | Albertini et al. | 379/131 |
| 3,943,526 | 3/1976 | Albertini et al. | 379/74 |
| 4,935,956 | 6/1990 | Hellwarth et al. | 379/112 |

*Primary Examiner*—Curtis A. Kuntz
*Assistant Examiner*—Binh K. Tieu
*Attorney, Agent, or Firm*—R. William Graham

[57]  ABSTRACT

A billing system includes a telephone, a detector operably associated with said telephone for detecting when the telephone is in use and generating a signal in response to the use, a first cpu operably associated with said detector and having billing software resident on the first cpu for enabling logging of client data, user data, wherein the billing software is automatically initiated in response to the signal and prompts a user to select one of a logging and no logging of the use, the billing software includes an accrual associating device for accruing an amount of time of the use and associating the time with one client upon selection of the logging and the billing software includes a writing storing component for writing and storing data corresponding to the amount of time and the client in a memory associated with the first cpu.

18 Claims, 5 Drawing Sheets

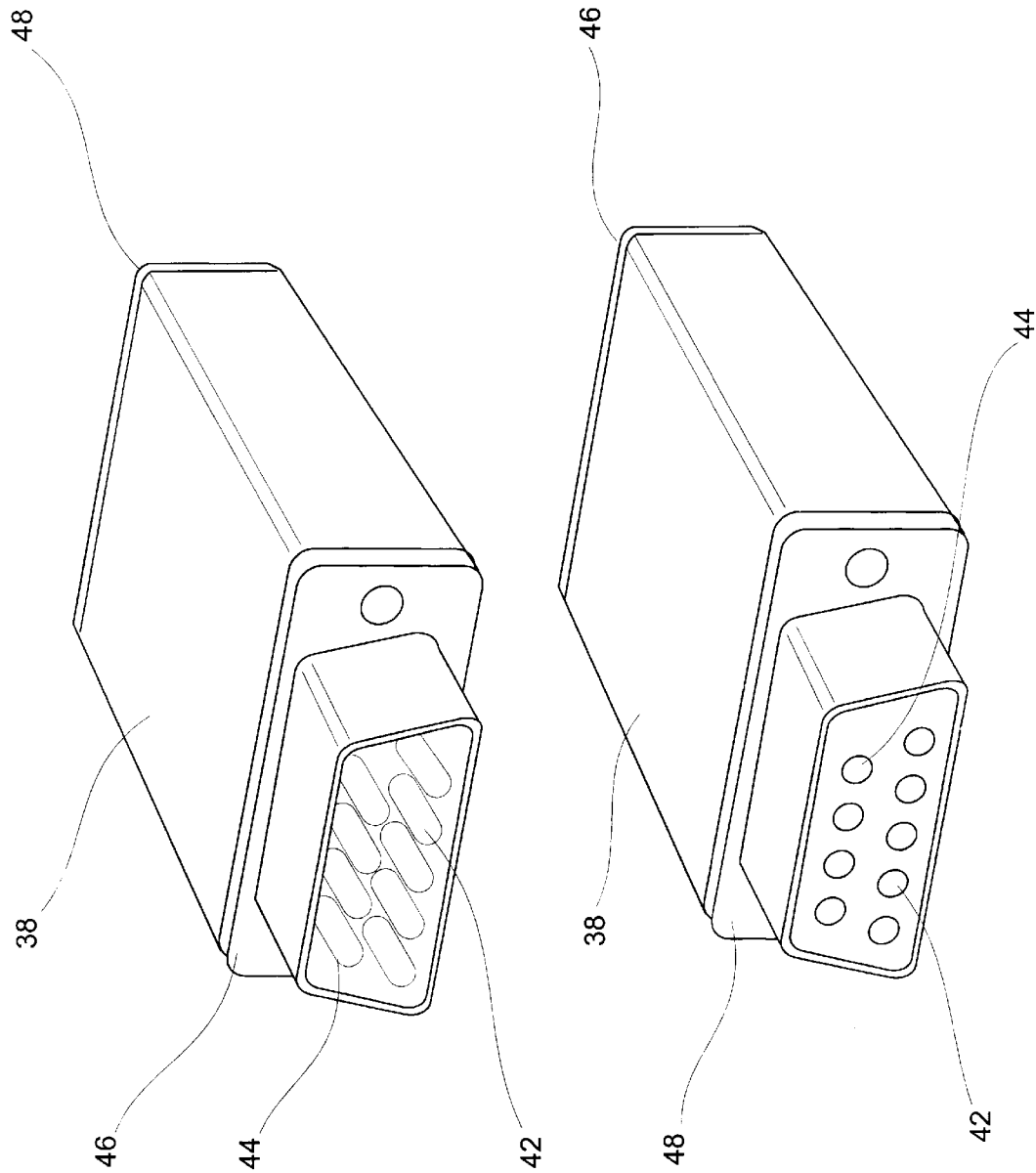

BILLING SYSTEM

BACKGROUND OF THE INVENTION

1. Field of the Invention

The present invention relates to a billing system. More particularly, this invention relates to a billing system which provides enhanced forced accounting and reduced billing features.

2. Related Art

There are a number of software billing systems which exist in the art. These commonly include a manual entry of time and enable in-house creation of a bill. These systems fail to adequately alleviate the problems associated with billing systems.

For example, some of these systems require that the service provider input time and then create a bill. However, the trend of professionals is to become more self-sufficient in their jobs and often requires the professional, accountant or lawyer for example, to become more computer-interactive and produce much of the work product. Depending upon the particular profession, there is a need to accurately account for and bill a client as a function of time spent on a particular matter.

Accounting for phone time remains troublesome. This is due to the fact that many of the calls which are made or received on behalf of a client may only account for a couple of minutes time to the professional and becomes either a nuisance to the professional to administratively log, bill and follow up weighed against the actual amount o f time billed. Additionally, when the professional currently logs phone call time, it is commonly done in a preset increment of an hour, such as a sixth (10 minutes) of an hour, to account not only for the phone time, but also for the administrative time for billing and accounting. This can result in the client being over charged for the actual professional time spent.

Accordingly, there remains a need for a better billing system. The present invention overcomes these problems.

BRIEF SUMMARY OF THE INVENTION

It is an object of the present invention to improve billing systems.

It is another object to improve the equipment used in a billing system.

Accordingly, the present invention is directed to a billing system which includes a telephone and a first cpu. The invention also includes means operably associated with the first cpu for detecting when the telephone is in use and generating a signal in response thereto.

There are software means resident on the first cpu for enabling logging of client data, service provider data and associating and accruing call time with a particular client each time the telephone is used into a stored data file in a memory associated with the first cpu. Means operably associated with the detecting means are also included for receiving the signal and automatically initiating the software means upon receipt thereof, The invention further includes second cpu, preferably remotely located, operably associated with the first cpu with complimentary software means resident thereon for enabling communication with the software in the first cpu. The software means in the first cpu includes means for manually or automatically transmitting the data file to the second cpu. The software means of the second cpu has means for manually or automatically receiving and manipulating the data file in a manner to create an invoice to the client for the professional.

The embodiment of the invention is generally directed to a billing system, which includes a telephone and means operably associated with said telephone for detecting when the telephone is in use and generating a signal in response to the use. A first cpu is operably associated with the detecting means and has billing software means resident on the first cpu for enabling logging of client data, service provider data, wherein said billing software means is automatically initiated in response to the signal and prompts a service provider to select one of a logging and no logging of said use, the billing software means includes means for accruing an amount of time of the use and associating the time with one client upon selection of the logging and the billing software means includes means for writing and storing data corresponding to the amount of time and the client in a memory associated with the first cpu.

Other objects and advantages will be readily apparent to those skilled in the art upon viewing the drawings and reading the detailed description hereafter.

BRIEF DESCRIPTION OF THE DRAWINGS

FIG. 3 is a end perspective view of a part of an adapter of the present invention.

FIG. 4 is another end perspective view of the part of FIG. 3.

DETAILED DESCRIPTION OF THE INVENTION

Figure 1:
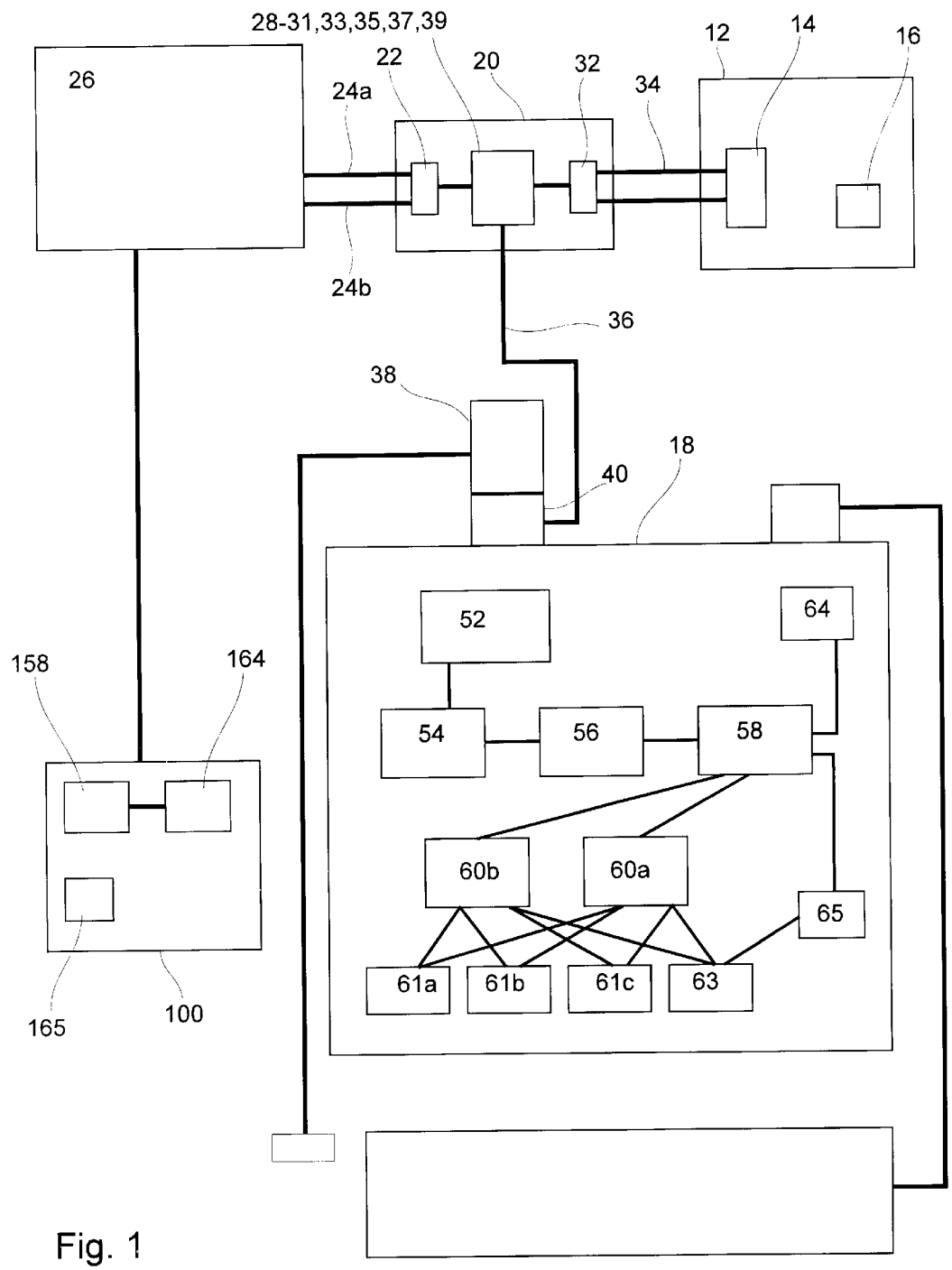
FIG. 1 is a schematic of the present invention.

Referring now to the drawings, the billing system of the present invention is generally referred to by the numeral 10. The billing system 10 includes a telephone 12 having a handset 14 and optionally, a speaker hands-free button 16. The invention also includes a cpu 18 which is operably connected to the telephone 12 as hereinafter described. It is contemplated that other voice communication means may be employed, for example, voice communication through the cpu 18 and that these devices are contemplated within the invention. It is understood that cpu 18 has operably associated memory and operating system, clock, monitor and keyboard.

Figure 2A:
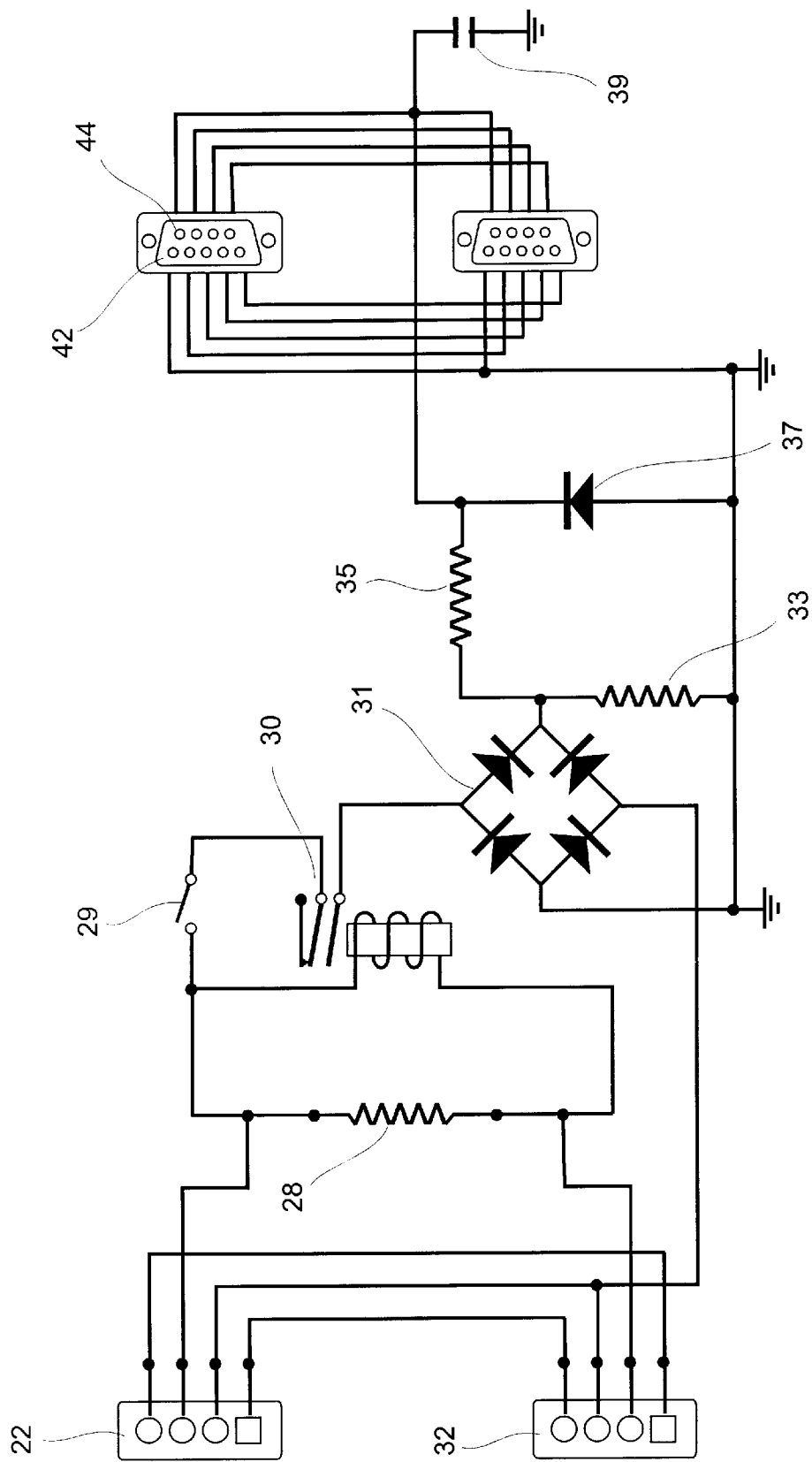
FIG. 2a is a schematic diagram of a telephone use detector with the present invention.

A telephone use detector 20 is operably connected with the telephone 12 the cpu 18 and a service source 26 for detecting when the telephone 12 is in use and generates a signal in response to such use. Referring to FIG. 2, the telephone use detector 20 includes a conventional telephone jack port 22 (MODF1) to receive a terminal end of a telephone line 24 from the service source 26. The port 22 is operatively connected to a resistor 28 and relay 30 which are in parallel arrangement with one another.

The resistor 28 and relay 30 are also connected to another telephone line port 32 (MODF2) which receives a conventional terminal end of a telephone line 34 which has its other terminal end connected to the telephone 12. The relay 30 is operatively connected via a disable switch 29 to a full-wave bridge rectifier 31 which will automatically correct the line polarity in the event that the telephone service source 26 is miss-wired. Resistors 33 and 35 and zener diode 37 are operatively connected such that when the telephone 12 is in use, current will flow in the line 36 via the relay 30 being energized providing approximately 0.5 volts D.C. across the diode 37. The output of the diode 37 is connected to the pin 44, as shown in FIGS. 3 and 4, for example, which connect to the cpu 18 as described below. A capacitor 39 is provided to filter signal current sent to the cpu 18 and eliminate short transients.

It should be noted that this embodiment utilizes the power obtained directly from the telephone service sources 26. Therefore, there should be a common ground with the computer. This ground can be established, for example, by connecting the grounded side of the circuit directly to the center screw of a telephone jack utility box via a conducting wire.

Figure 2B:
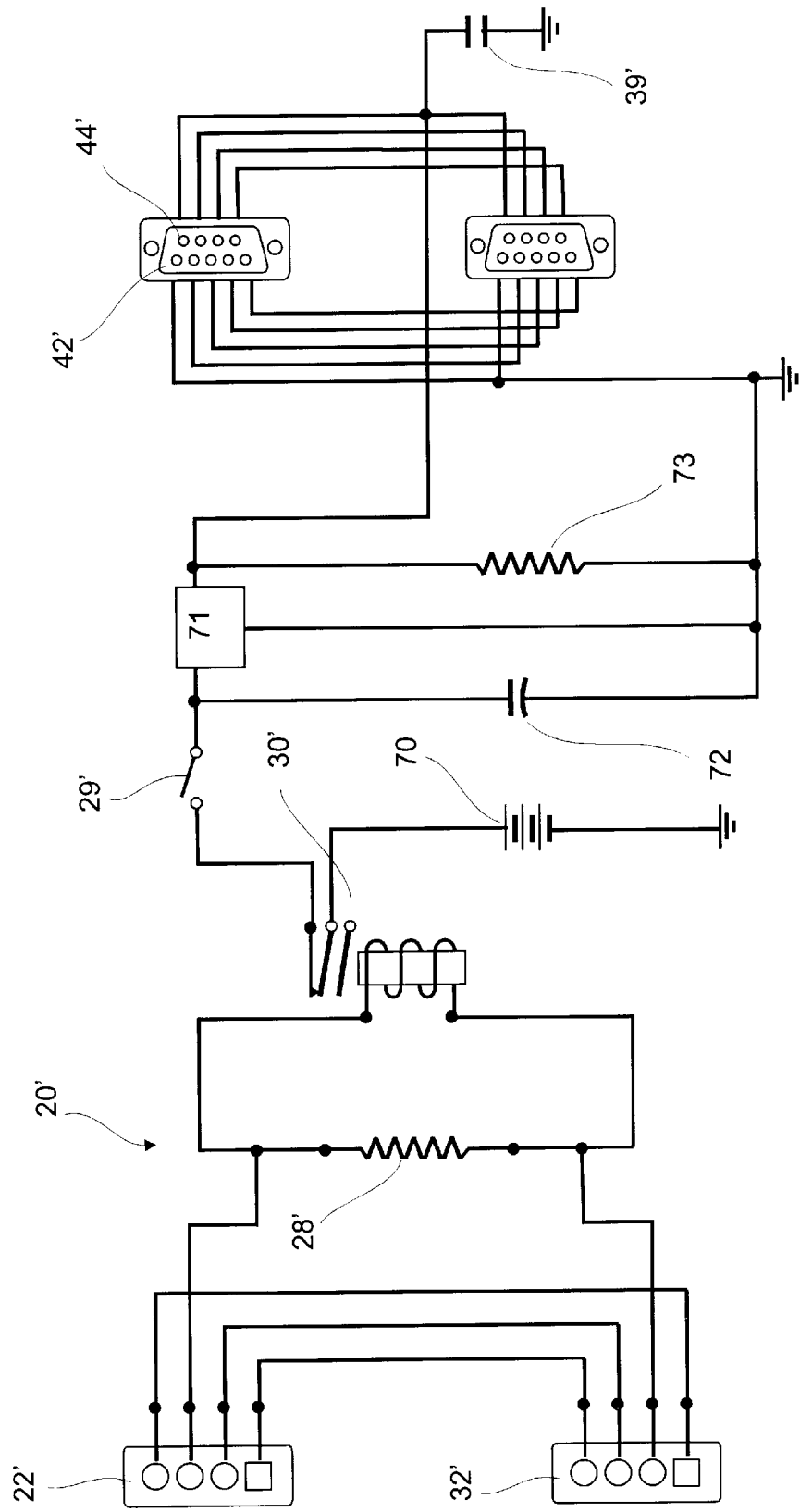
FIG. 2b is a schematic diagram of another telephone use detector with the present invention.
Figure 5:
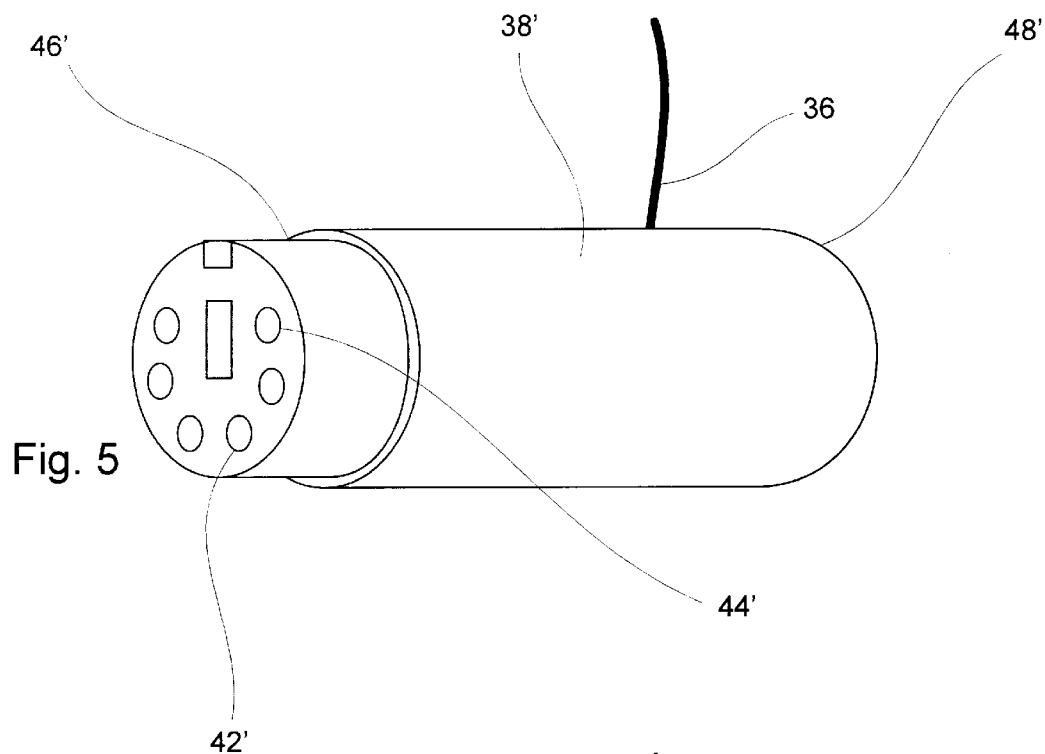
FIG. 5 is a end perspective view of a part of an adapter of the present invention.
Figure 6:
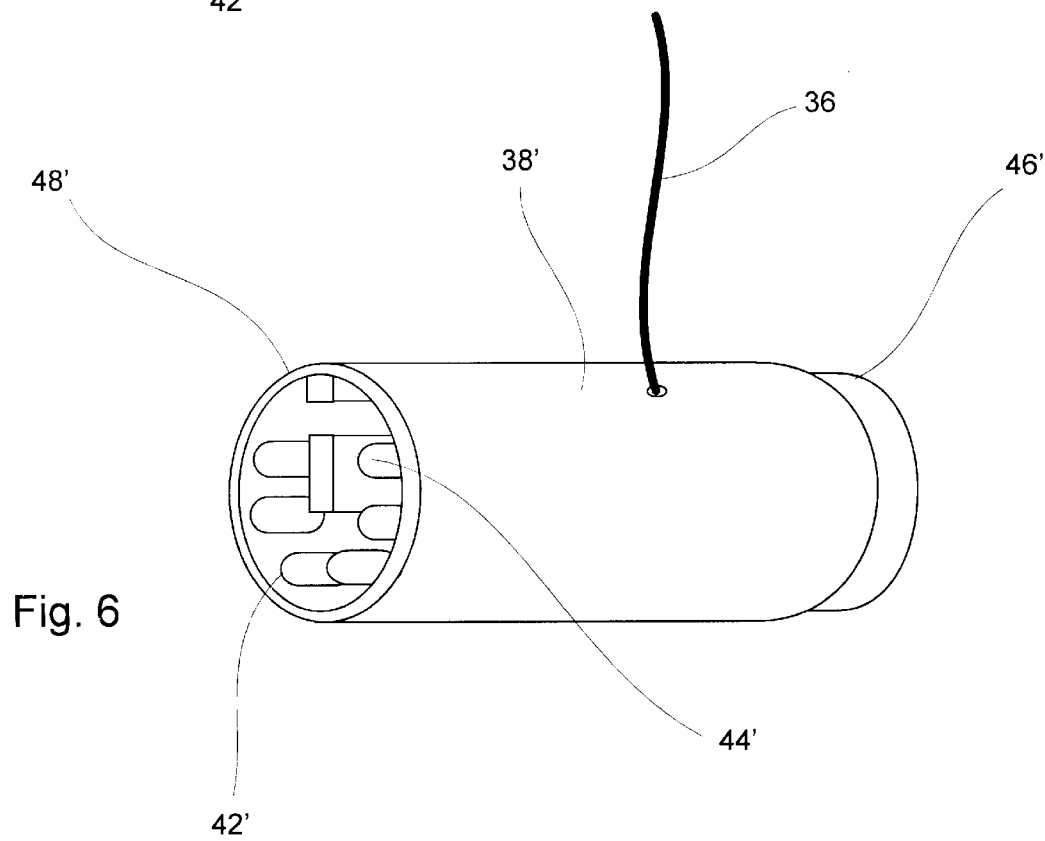
FIG. 6 is another end perspective view of the part of FIG. 5.

Another embodiment of the telephone use detector 20' is shown in FIG. 2b. Here, the detector 20 is likewise operably connected to the telephone 12, the cpu 18 and the service source 26 for detecting when the telephone 12 is in use and generates a signal in response to such use. The detector 20 includes a conventional telephone jack port 22' (MODF1) to receive a terminal end of a telephone line 24 from the service source 26. The port 22 is operatively connected to a resistor 28' and relay 30' which are in parallel arrangement with one another.

The resistor 28' and relay 30' are also connected to another telephone line port 32 (MODF2) which receives a conventional terminal end of the telephone line 34 which has its other terminal end connected to the telephone 12. The relay 30' is operatively connected via the disable switch 29' to a battery 70 (e.g., a v battery as is commonly used in transistor radios). Regulator 71 and capacitor 72 are operatively connected such that when the telephone 12 is removed from its hook, current will flow in the line 26 causing relay 30' to energize providing power to regulator 71 which produces approximately 5 volts D.C. across resistor 73. The output of regulator 71 is connected to pin 44, as shown in FIGS. 3 and 4, for example, which connect to the cpu 18 as described above. A capacitor 39 is provided to filter the signal being sent to the cpu 18 to eliminate short transients.

A line 36 is operatively associated with the relay 30 of the detector 20 at one end such that current runs through the line 36 when the relay 30 is in a closed position indicating that the telephone 12 is in use. Another end of the line 36 operatively connects to an adapter 38 designed to connect to a port 40 of the cpu 18, for example, a serial port or mouse port. The adapter 38 is equipped with conventional number of pins 42 as would be required for such port 40 one pin 44 of which is operatively connected to the line 36. The adapter 38 includes a male end 46 and female end 48. The pins 42 extend from the male end 46 to the female end 48. In this regard, the female end 48 is formed to operably receive a male end of a conventional mouse adapter 50. A terminate and stay resident (TSR) software means 52 is operatively resident in the memory on the cpu 18 and is preferably always operating and running on the cpu 18 for looking at the pin 44 to determine if a current exists in the pin 44. The TSR 52 includes means 56 for initiating billing software means 58 once a current is detected in the pin 44. It is understood that other modifications, derivations and improvements of performing this aspect of the invention will be readily apparent to persons skilled in the art.

The billing software means 58 is operatively resident in the memory of the cpu 18 and includes means 60a for associating, logging and storing of first client data into a client data file 61a, call comment data into a comment data file 61b and service provider data into a service provider data file 61c and for associating and accruing the amount of time for which there is a current detected in line 36 ("call time") and date of such call with a first particular client and, if the call is desired to be billed to the first client, writing and storing such data into a call data file 63.

The billing software means 58 can pause the accrual aspect of means 60a in a manner to stay accrual of the call time for the first client call for a condition such as another call being received or made on line 36, using call waiting or three way calling modes, for example. This permits the billable call time to be accurately reflected for the first client. In this vein, the billing software means 58 is capable, preferably automatically in a like manner as described above, of initiating another means 60b for associating, logging and storing of second client data into a client data file 61a, call comment data into a comment data file 61b and service provider data into a service provider data file 61c and associating and accruing the amount of time for which there is a current detected in line 36 ("call time") and date of such call with a second client and, if the call is desired to be billed to the second client, writing and storing such data into a call data file 63.

It is noted that means 60 can be initiated by the user by using an edit mode of billing software means 58 for purposes of editing the data. In addition, for the case of multiple lines, the detector 20 is preferably equipped to detect usage on multiple lines 24a and 24b. For example, the current detected in lines 24a and 24b can be added together and the TSR means 52 can further detect the additional current and initiate the billing software means 58 to initiate means 60b.

Upon initiated, billing software means 58 displays a screen (e.g., a windows-based screen) on the monitor prompting the service provider to log the call or cancel the logging of the call. If the service provider cancels the logging, the screen disappears, the billing software means 58 application is terminated, and the screen reverts to a prior application which may have been running.

Upon selecting logging of the call, billing software means 58 displays a screen requesting service provider to select whether the call is to be billed to a "new client" or "old client." In selecting "old client" the billing software means 58 displays a screen requesting service provider to select with which client the call time data, date data and comment data is to be associated. Upon selection of the client, the means 60 is initiated and a screen is displayed requesting the service provider to enter comments to be associated with the call, where after entry, the screen disappears and returns to the prior screen (thus task switching back to the prior window environment), the means 60 associates the call time data, date data and comment data with the selected client from the client data file 61a. Upon completion of the call, i.e., the line current ceases to be detected by the TSR means 52, the means 60 stores the associated call time data, date data, client data, and comment data with the service provider data into the call data file 63 in the memory of the cpu 18.

Means 60 permits entry of client data into client data file 61a via a client screen which displays client name field, contact name field, street address field, city address field, state zip code field, country field, work, fax and home telephone fields. Similarly, permitted is the entry of comment data into the comment data file 61b via of a comment screen having comment field. Likewise, entry of service provider data is permitted via a service provider screen having company name field, service provider name field, street address field, city address field, state zip code field, country field, work, fax and home telephone fields, hourly rate field and COM port field is permitted and stored in the service provider data file 61c. The software means 58 further has means 65 for encrypting the data in the data file 63.

Another aspect of the invention includes second cpu 100 operably associated with the first cpu 18 via, for example, the service source 26 and conventional cpu modem links or a network. The cpu 100 likewise includes operably associated memory and operating system, clock, monitor and keyboard and is provided with complimentary billing software means 158 resident in the memory of the cpu 100 and has means 165 for de-encrypting the data 63. The billing software means 58 and 158 include means 64 and 164, respectively, for communicating with one another in a manner such that the data in the data file 63 may be transmitted, preferably in an encrypted form, and de-encrypted by the receiving cpu, here cpu 100, for purposes of generating a bill to the client. In this regard, the communication means 64 is equipped to perform one of automatically transmitting the data at a predetermined time of each month or manually transmitting the data at the service provider's initiation. In the case of electing automatic transmission, the communication means 64 transmits at the predetermined time/date upon the initiation of the billing software means 58. The communication means 164 is preferably continuously set up to receive the transmitted data and in turn, de-encrypt if needed, and generate a bill (by way of any suitable printing means) to the client on behalf of the service provider. Herein, the bill generated would include listing the client data and service provider data with itemized call time data and associated comment data. The software means in the first cpu includes means for manually or automatically transmitting the data file to the second cpu.

The above described embodiment is set forth by way of example and is not for the purpose of limiting the present invention. It will be readily apparent to those skilled in the art that obvious modifications, derivations and variations can be made to the embodiment without departing from the scope of the invention. Accordingly, the claims appended hereto should be read in their full scope including any such modifications, derivations and variations.

What is claimed is:

1. A billing system for a service provider-client environment, which includes:

a service provider site;

a telephone device disposed at said service provider site;

means disposed at said service provider site operably associated with said telephone device for detecting when the telephone device is in use and generating a signal in response to said use;

a first CPU disposed at said service provider site operably associated with said detecting means and having billing software means resident on said first CPU for enabling logging by a service provider of client data and service provider data, wherein said billing software means is automatically initiated in response to said signal and prompts a service provider to select one of a logging and no logging of said use, said billing software means includes means for accruing an amount of time of said use and associating said time with one client upon selection of said logging and said billing software means includes means for writing and storing data corresponding to said amount of time and said client in a memory associated with said first CPU.

2. The billing system of claim 1, wherein said first cpu includes means operably associated with said detecting means for receiving said signal and automatically initiating said software means upon receipt thereof.

3. The billing system of claim 1, which further includes a second CPU disposed at a remote site operably associated with the first CPU having complimentary software means resident thereon for enabling communication with said software on said first CPU.

4. The billing system of claim 3, wherein said software means in said first cpu includes means for one of manually and automatically transmitting said data file to said second cpu and said software means of said second cpu includes means for one of manually and automatically receiving and manipulating said data file in a manner to permit creating an invoice to the client for the service provider.

5. The billing system of claim 1, wherein said billing software means is further characterized to enable logging, writing and storing of comment data in said memory and further associating said amount of time and said client with said comment data.

6. The billing system of claim 1, wherein said billing software means is further characterized as being capable of staying accrual of said time.

7. The billing system of claim 1, wherein said billing software means is further characterized to include means for encrypting said data.

8. The billing system of claim 7, wherein said billing software means is further characterized to include means for de-encrypting said data.

9. The billing system of claim 3, wherein said billing software means on said first cpu is further characterized to include means for encrypting said data and said billing software means on said second cpu is further characterized to include means for de-encrypting said data.

10. A billing system for a service provider-client environment, which includes:

a service provider site;

a communications linking device disposed at said service provider site;

a first CPU disposed at said service provider site operably associated with said communication linking device and having billing software means resident on said first CPU for enabling logging of client data and service provider data, wherein said billing software means prompts a service provider to select one of a logging and no logging of time, said billing software means includes means for accruing an amount of time and associating said time with one client upon selection of said logging and said billing software means includes means for transmitting a signal in response to said time and associated client; and a second CPU disposed at a remote site operably associated with said communication linking device in a manner to permit communication with said first CPU having complimentary software means resident thereon for enabling communication with said software on said first CPU in order to receive said signal corresponding to said amount of time and said client and for manipulating said data corresponding to said amount of time and said client in a manner to produce a billing output.

11. The billing system of claim 10, which further includes means for writing and storing data corresponding to said amount of time and said client in a memory associated with said first CPU.

12. The billing system of claim 11, wherein said software means in said first cpu includes means for one of manually and automatically transmitting said data file to said second cpu and said software means of said second cpu includes means for one of manually and automatically receiving and manipulating said data file in a manner to permit creating an invoice to the client for the service provider.

13. The billing system of claim 11, wherein said billing software means in said first cpu is further characterized to enable logging, writing and storing of comment data in said memory and further associating said amount of time and said client with said comment data.

14. The billing system of claim 10, wherein said billing software means in said first cpu is further characterized as being capable of staying accrual of said time.

15. The billing system of claim 10, wherein said billing software means is further characterized to include means for encrypting said data.

16. The billing system of claim 15, wherein said billing software means is further characterized to include means for de-encrypting said data.

17. The billing system of claim 10, wherein said billing software means on said first cpu is further characterized to include means for encrypting said data and said billing software means on said second cpu is further characterized to include means for de-encrypting said data.

18. The billing system of claim 1, wherein said software means in said first CPU includes software means for enabling manipulation of said data file in a manner to permit creating an invoice to the client for the service provider.

\* \* \* \* \*